United States Patent
Cai et al.

(10) Patent No.: US 6,909,826 B2
(45) Date of Patent: Jun. 21, 2005

(54) MULTIPLE GRATING OPTICAL WAVEGUIDE MONITOR

(75) Inventors: Yongming Cai, San Jose, CA (US); Christopher Stephen Koeppen, New Hope, PA (US); Stephan F. Wielandy, Belle Mead, NJ (US)

(73) Assignee: Princeton Lightwave, Inc., Cranbury, NJ (US)

( * ) Notice: Subject to any disclaimer, the term of this patent is extended or adjusted under 35 U.S.C. 154(b) by 388 days.

(21) Appl. No.: 09/948,325

(22) Filed: Sep. 6, 2001

(65) Prior Publication Data

US 2002/0041735 A1 Apr. 11, 2002

Related U.S. Application Data

(63) Continuation-in-part of application No. 09/428,723, filed on Oct. 28, 1999, now abandoned.

(51) Int. Cl.[7] ................................................. G02B 6/34
(52) U.S. Cl. .............................. 385/37; 385/10; 385/18; 385/47
(58) Field of Search ........................... 385/10, 18, 31, 385/37, 47, 48

(56) References Cited

U.S. PATENT DOCUMENTS

| | | | |
|---|---|---|---|
| 5,461,687 A | 10/1995 | Brock | |
| 5,946,128 A | 8/1999 | Pack | |
| 6,097,859 A | * 8/2000 | Solgaard et al. | 385/17 |
| 6,122,422 A | * 9/2000 | Koeppen et al. | 385/48 |
| 2001/0014196 A1 | 8/2001 | Solgaard et al. | |

FOREIGN PATENT DOCUMENTS

| | | |
|---|---|---|
| EP | 1096280 A1 | 5/2001 |
| EP | 1130656 A1 | 9/2001 |
| WO | WO 01/37014 A1 | 5/2001 |

* cited by examiner

*Primary Examiner*—Juliana Kang
(74) *Attorney, Agent, or Firm*—Mintz, Levin, Cohn, Ferris, Glovsky and Popeo, P.C.

(57) ABSTRACT

An optical monitoring arrangement utilizes the properties of a blazed Bragg grating to redirect a portion of an optical signal out of the axial path and into a detecting device. A plurality of blazed Bragg gratings are utilized, each having unique properties, to increase the robustness of the monitor. In particular, by utilizing a plurality of N gratings, the bandwidth of the monitor may be increased N-fold (assuming no overlap in wavelength between gratings). Alternatively, an improvement in resolution can be obtained by utilizing a narrower bandwidth and measuring N times the number of raw data points within that bandwidth. A combination of increase in bandwidth and resolution may be obtained by a comprise between these two extremes. Chirped blazed gratings may also be employed.

47 Claims, 4 Drawing Sheets

MULTIPLE GRATING OPTICAL WAVEGUIDE MONITOR

This application is a continuation-in-part of prior application Ser. No. 09/428,723, filed Oct. 28, 1999 now abandoned.

FIELD OF THE INVENTION

The present invention relates to an optical monitor utilizing waveguide gratings to redirect certain wavelengths to a monitoring device and, more particularly, to using multiple blazed gratings to improve the resolution and performance of the monitoring device.

BACKGROUND OF THE INVENTION

In multi-wavelength optical communication systems (usually referred to as "wavelength division multiplexed" or WDM systems), efficient wavelength-selective means for tapping electromagnetic radiation (to be referred to herein as "light", regardless of wavelength) from an optical fiber could be advantageously used in a variety of functions, e.g., as a wavelength monitor, channel monitor, demultiplexer, amplifier monitor, or in a feedback loop with an optical amplifier.

U.S. Pat. No. 5,061,032 issued to G. Meltz et al. on Oct. 29, 1991, discloses an optical fiber tap that comprises a blazed, chirped refractive index grating selected to redirect light guided in the fiber such that it comes to a focus at a point outside of the fiber. As used throughout this discussion, the term "blazed" refers to a grating where the plane of the index perturbations (i.e., gratings) is not perpendicular to the propagation direction of the guided mode or modes within the fiber. A grating is "chirped" if the (optical) repeat distance $\Lambda$ between the index perturbations is not constant as a function of the axial coordinate z of the fiber, i.e., if $\Lambda=\Lambda(z)$. An exemplary dispersive optical waveguide tap including a blazed and chirped refractive index grating is disclosed in U.S. Pat. No. 5,832,156 issued to T. A. Strasser et al. on Nov. 3, 1998. In particular, Strasser et al. utilize a coupling means disposed contiguous with the optical fiber in the region of the grating to direct the tapped modes into an associated detector apparatus, such as an array of photodiodes. The blazed grating in the fiber also functions to angularly ($\theta$) disperse the light such that different wavelengths can be imaged by the coupling means onto different detector elements within the array. Consequently, the electrical signals of the detector array map out the spectrum of light associated with the original signal propagating through the fiber.

The optical performance and cost of various prior art optical monitors (as defined by parameters such as bandwidth, resolution and accuracy) are primarily determined by the grating/detector combination utilized. In many newer applications, such as measuring optical signal-to-noise ratios (OSNRs) of tightly-spaced dense WDM ("DWDM") channels (e.g., 50 Ghz and closer spacings), extended dynamic range measurements, simultaneous monitoring of ultrawide (e.g., 60–80 nm) or multiple bands (e.g., C and L), as well as simultaneous monitoring of multiple network elements (e.g., amplifier and add/drop nodes), the combined cost/performance of the prior art devices does not meet the desired targets.

Thus, a need remains in the art for an optical waveguide tap that remains cost-effective while able to provide increased bandwidth and/or resolution for new and emerging optical applications.

SUMMARY OF THE INVENTION

The need remaining in the prior art is addressed by the present invention, which relates to an optical monitor utilizing waveguide gratings to redirect certain wavelengths to a monitoring device and, more particularly, to using multiple blazed gratings to improve the resolution and performance of the monitoring device.

The present invention is embodied in an article comprising two distinct blazed Bragg gratings disposed side-by-side. For light incident from either output of an associated 1×2 optical switch, one or the other blazed Bragg grating serves to tap light out of the fiber and, ultimately, into an associated detector (photodiode array). In the monitoring arrangement of this particular embodiment of the present invention, only one blazed Bragg grating is "active" at a time. That is, light entering an input port of a 1×2 optical switch is directed exclusively to one of the two output ports (and thus into one of the pair of blazed Bragg gratings). In general, each grating may have a separate optical source associated therewith or, in yet another embodiment, a plurality of M optical signals may used, in a predetermined combination, with a plurality of N gratings.

In accordance with the teachings of the present invention, the parameters of the two blazed Bragg gratings can be chosen such that, for example, they tap out light in different wavelength ranges, thus increasing the overall bandwidth of the monitor. Alternatively, an improvement in resolution can be obtained by utilizing a narrower bandwidth and measuring twice the number of raw data points within that bandwidth. A compromised embodiment of the present invention may improve both bandwidth and resolution by applying both techniques (i.e., by increasing, but not doubling, the bandwidth, an increased number of raw data points can still be collected).

In its most general form, the monitor of the present invention may include N such blazed Bragg gratings, used with an associated 1×N switch (or a plurality of N off/on switches). In this case, an N-fold improvement in bandwidth/resolution can be obtained. When used in association with various other optical input elements (such as, for example, couplers or other pass through elements), any number of different optical signals may be used. In fact, the multiple grating monitor of the present invention may be used to study a variety of different optical signals associated with a given optical system.

Various other embodiments of the present invention may be formed using bulk optic elements in place of the blazed fiber gratings. In particular, bulk optic diffraction gratings or prisms may be used to separate an incoming beam into a plurdlity of dispersed components to be directed toward a detector array, where an optical switch (or an optical beam splitter and shutter combination) can be used with appropriate lensing to select which output will be directed toward the detector array.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
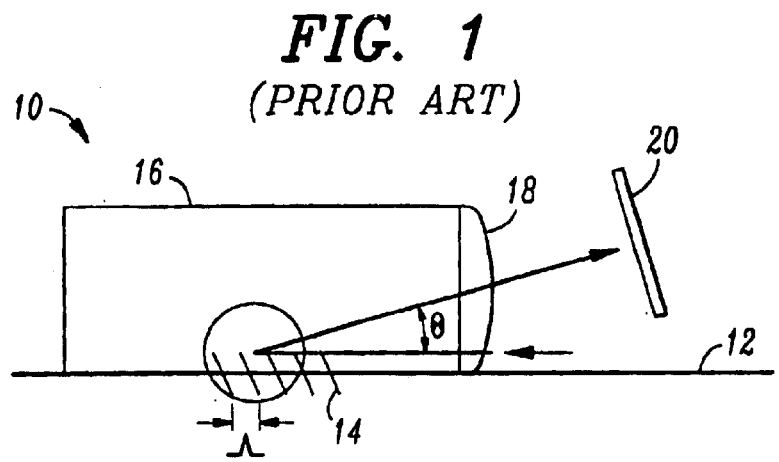
FIG. 1 is a top view of a prior art blazed Bragg grating optical tap arrangement.
Figure 2:
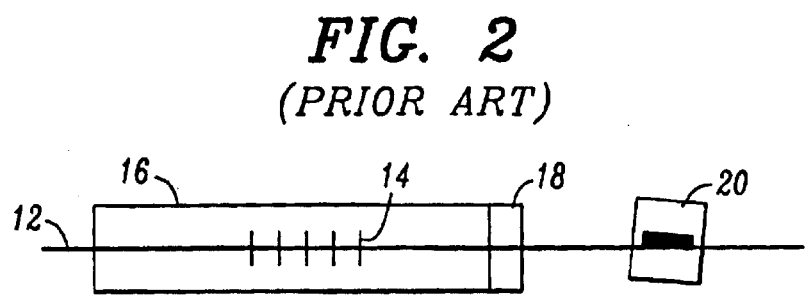
FIG. 2 is a side view of the prior art arrangement of FIG. 1.

In order to aid in the understanding of the present invention, a conventional, prior art optical tap monitor will be briefly described, where one such arrangement 10 is illustrated in a top view in FIG. 1 and a side view in FIG. 2. An optical waveguide 12 (in this case, an optical fiber—although any optical guiding medium may be used) includes a blazed Bragg grating 14. To simplify the diagrams of FIGS. 1 and 2 (as well as all following illustrations), fiber 12 is illustrated by a single line. It is be understood that in actuality fiber 12 includes a core region (for light guiding) and a surrounding cladding layer, where blazed Bragg grating 14 is formed in the core in conventional fashion. By way of example, the fiber may comprise a conventional silica-base single mode fiber and the grating may be "written" (i.e., photolithographically etched) into the fiber using a phase mask. The grating period $\Lambda$ and blaze $\theta$ (i.e., tilt with respect to the optical axis) are chosen to tap (hereinafter referred to as "redirect", where the use of this term is understood as redirecting a portion of the optical signal power, anywhere from 1% to 99%, for example, as desired by the user) optical wavelengths within a desired bandwidth $\Delta\lambda$. Referring back to FIG. 1, an index-matched glass block 16 is disposed adjacent to fiber 12 and includes a lens element 18 for focusing the re-directed light signal onto a detector array 20, where detector array may comprise an array of InGaAs photodiodes. Consequently, the electrical signals of the detector array map out the spectrum of light associated with the input signal. Conventional control electronics (not shown) can then be used to extract and analyze the detector array data. The specific data may then define the optical spectrum and the number of DWDM channels along with their wavelengths, powers, and signal-to-noise ratios (SNRs). As mentioned above, the prior art arrangement as depicted in FIGS. 1 and 2 is limited in terms of the bandwidth and resolution that may be achieved with the particular combination of blazed Bragg grating 14 and photodetector array 20.

Figure 3:
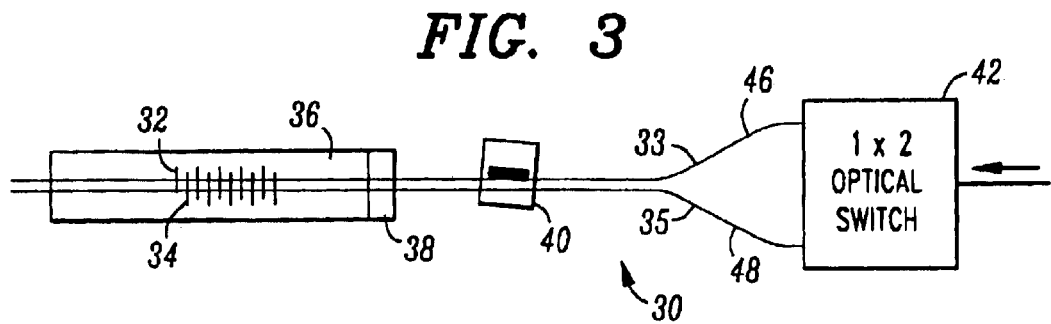
FIG. 3 contains a side view of an exemplary multiple blazed Bragg grating optical tap arrangement formed in accordance with the present invention.
Figure 4:
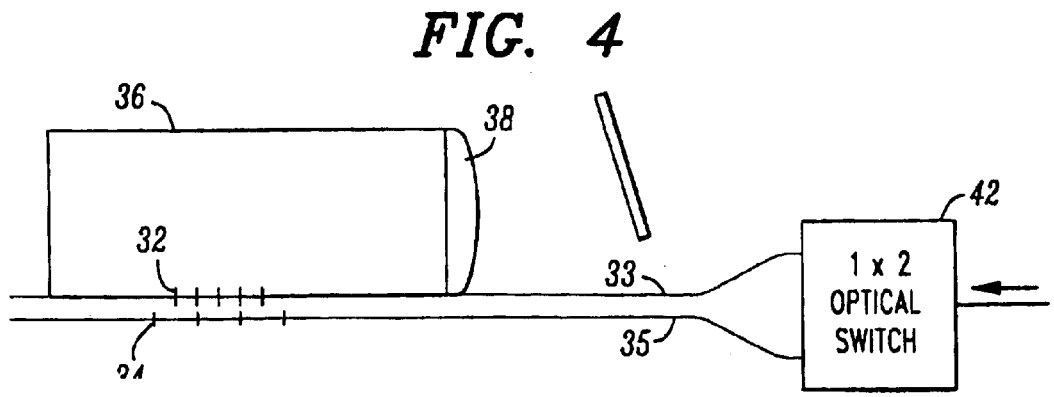
FIG. 4 is a top view of the embodiment of FIG. 3, illustrating in particular the side-by-side disposition of the pair of blazed gratings as used in the present invention.

The use of multiple blazed gratings, in accordance with the present invention, is considered to overcome these limitations of the prior art. FIG. 3 contains a side view of an exemplary optical monitor 30 formed in accordance with the present invention that utilizes a pair of blazed Bragg gratings 32 and 34 formed in an associated pair of optical fibers (or any other appropriate light guiding material) 33 and 35, respectively, to improve the overall bandwidth and resolution of optical monitor 30. A top view of optical monitor 30, illustrating clearly the side-by-side disposition of blazed Bragg gratings 32 and 34, is shown in FIG. 4. As with the prior art arrangements, gratings 32,34 are bonded to an index-matching glass block 36 including a lensed endface 38. A photodetector array 40 is positioned so as to capture the optical signal redirected ("tapped") by gratings 32,34.

In accordance with an exemplary embodiment of the present invention, first blazed Bragg grating 32 is formed to exhibit a first grating period $\Lambda_1$ and blaze angle $\theta_1$ that will function to redirect a predetermined optical spectrum $\lambda_A$–$\lambda_B$ out of fiber 33 and toward detector array 40. In particular, by controlling the angular displacement, the particular subset of photodiodes within array 40 that are illuminated by spectrum $\lambda_A$–$\lambda_B$ can be similarly controlled. Second blazed Bragg grating 34 is formed, in accordance with this embodiment of the present invention, to exhibit a second, different grating period $\Lambda_2$ and blaze angle $\theta_2$ associated with the redirection of a different spectrum $\lambda_X$–$\lambda_Y$. The use of different blaze angles and grating periods function to change the spectral band imaged onto the detector array. Referring to FIGS. 3 and 4, a 1×2 optical switch 42 is shown as coupled to fibers 33 and 35, where the state of switch 42 is used to control which grating is "active" at a time, since in this embodiment only one blazed Bragg grating is used at any given time. That is, light entering input port 44 of 1×2 optical switch 42 is directed exclusively to one of the two output ports 46 and 48 of switch 42. Although not shown in the figures, optical switch 42 and photodetector array 40 are controlled by external electronics including a microprocessor for spectral calibration and various related calculations. It is to be understood that the arrangement of the present invention may use "unchirped" or "chirped" blazed gratings, as defined above, or any suitable combination of both "unchirped" and "chirped" blazed gratings.

In general, the advantage of the arrangement of the present invention derives from the ability to control the parameters of gratings 32 and 34. For example, the gratings can be designed such that they tap out light in different wavelength ranges, that is, with no spectral overlap between $\lambda_A$–$\lambda_B$ (denoted as range $R_{AB}$) and $\lambda_X$–$\lambda_Y$ (denoted as range $R_{XY}$). Consequently, switching 1×2 optical switch 42 between output ports 44 and 46 (equivalently, switching between gratings 32 and 34), results in spectra within the wavelength ranges $R_{AB}$ and $R_{XY}$, respectively, being imaged onto detector array 40. Since the bandwidth, denoted B, of monitor 30 is proportional to the focal length f, gratings 32,34 and the focusing optics (comprising glass block 36 and lens 38) can be chosen to provide improved performance in a number of different ways. For example, optical monitor 30 can be implemented so as to double the associated resolution of a given bandwidth. That is, using a factor of 2 longer focal length optics, each grating 32,34 can be used to image half of the desired bandwidth, yielding twice as many raw data points over the same wavelength range. Alternatively, the monitor's bandwidth may be doubled (for a given resolution) by implementing non-overlapping bands for each blazed Bragg grating. That is, by maintaining the same focal length optics, each grating 32 and 34 can be used to image distinct full bands onto photodetector array 40, doubling the total wavelength range. It is to be understood that between these two extremes one may incorporate both increased resolution and increased bandwidth.

Blazed Bragg gratings 32,34 may also be chosen such that they increase the total dynamic power range of monitor 30. As is well known in the art, blazed gratings can be fabricated to tap from less then 1% to greater than 99% of the light out of the fiber. Consequently, two gratings of largely different strengths can be used in a device that is controlled to switch between the two depending on the input power level. In particular, for high input powers, the weaker grating would be used and, similarly, for low power input signals, the stronger grating would be employed, ensuring in each instance that a sufficient power optical signal will impinge monitor 40. Advantageously, a significantly wider range of input powers (for example, up to 20 dB or more increase) could be measured with a single monitor 30.

Figure 5:
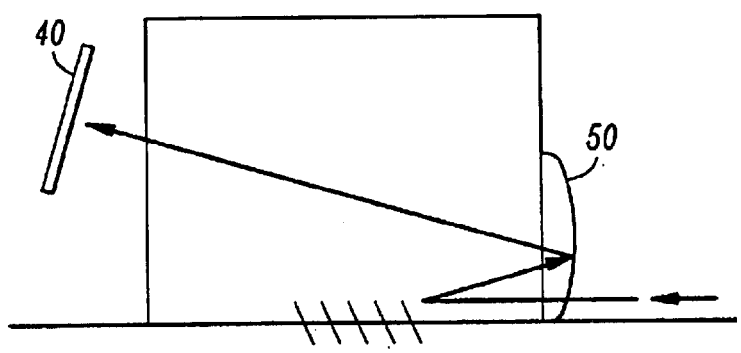
FIG. 5 illustrates an alternative embodiment of the present invention, incorporating reflective elements in the arrangement.

The geometry of monitor 30 is considered to be exemplary only, there are various other arrangements, well-known in the art, that may utilize multiple blazed Bragg gratings in accordance with the teachings of the present invention. In particular, FIG. 5 illustrates a reflective geometry arrangement where lens 38 of FIGS. 3 and 4 is replaced by a concave mirror 50 that will reflect the tapped light back through glass block 36 and into (re-positioned) detector array 40.

Figure 6:
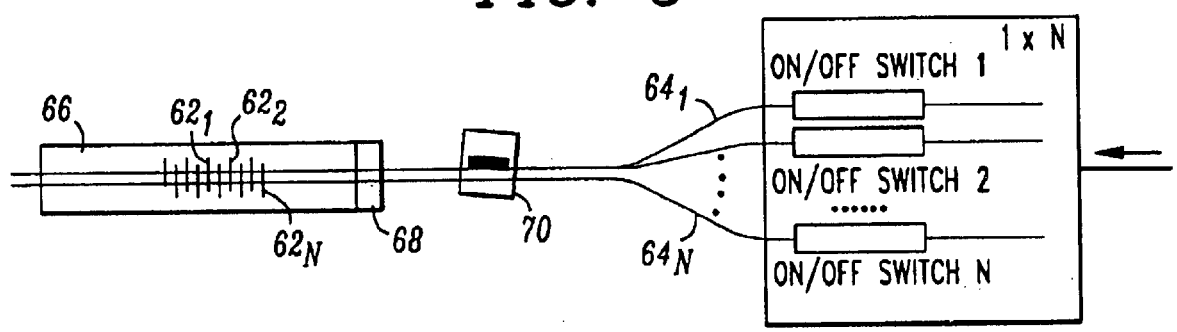
FIG. 6 is a side view of an embodiment of the present invention include N blazed gratings and an associated 1×N optical switch.

As mentioned above, the teachings of the present invention can be extended beyond the use of a pair of blazed Bragg gratings to an arrangement employing a plurality of N blazed Bragg gratings. FIG. 6 contains a side view of an N-element optical monitor 60 including a plurality of N blazed Bragg gratings $62_1$–$62_N$, stacked side-by-side, each grating formed within an associated optical waveguide (for example, optical fiber) $64_1$–$64_N$. The plurality of gratings $62_1$–$62_N$ are disposed adjacent to a glass block 66 and associated lensing element 68 which then function to focus the tapped light onto a photodetector array 70. In this particular embodiment, a 1×N optical switch 72 is used to control the particular grating that is "active" at a given time. Such an arrangement is particularly well-suited for DWDM applications that require the use of multiple, closely-spaced wavelengths.

Figure 7:
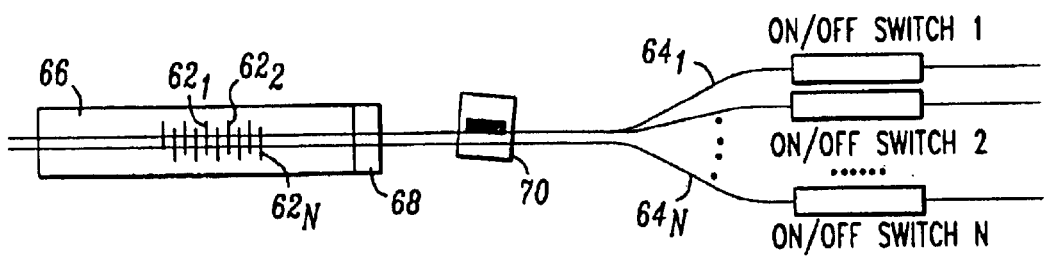
FIG. 7 is a side view of yet another embodiment of the present invention, where the 1×N optical switch of FIG. 6 has been replaced by a plurality of N on/off switches.

In an alternative embodiment, 1×N switch 72 can be replaced by a plurality of N on/off switches $74_1$–$74_N$, as shown in FIG. 7. This arrangement is particularly well-suited for monitoring multiple inputs, such as, for example, a plurality of N separate network elements that can be monitored with a single device.

EXAMPLE

We have experimentally demonstrated the multiple grating optical waveguide monitor as depicted in FIGS. 3 and 4. A pair of unchirped fiber blazed Bragg gratings 32 and 34, with center wavelengths of 1547 nm and 1575 nm, respectively, were used as the dispersive elements. The blaze angles $\theta_1$ and $\theta_2$ were chosen to be equal at a value of 9°, such that the wavelength 1547 nm from grating 32 and wavelength 1575 nm from grating 34 emanated at the same angle relative to the fiber axes, namely 18°. The gratings were photolithographically written in a conventional single mode silica-based fiber using phase masks. The lengths of the gratings were approximately 10 mm. The strengths of the gratings were such that ~20% of the single mode light at the center wavelengths were tapped out of the fibers. To achieve the fiber-to-block coupling, the gratings were bonded to a fused silica glass block (n=1.44 at 1550 nm) with an optically transparent, closely index-matching (n=1.56) adhesive. Glass block 36 was nominally 6 cm×3 cm×1 cm in dimension. A high-reflective dielectric (R>99%) concave mirror with a focal length of 100 mm served to focus the outcoupled light from both gratings 32 and 34 onto a 256 element linear InGaAs detector array (it is to be understood that a two-dimensional array can be used as an alternative). Each detector element was 30 $\mu$m in width and 250 $\mu$m long. The array covered a 35 nm wide range of wavelengths with each detector element corresponding to a 0.14 nm range of light. The inputs of the two gratings were fusion spliced to the outputs of a 1×2 opto-mechanical switch 42. A 5V signal applied to the electrical leads of the switch was used to toggle the switch back and forth between output ports 46 and 48.

Figure 8:
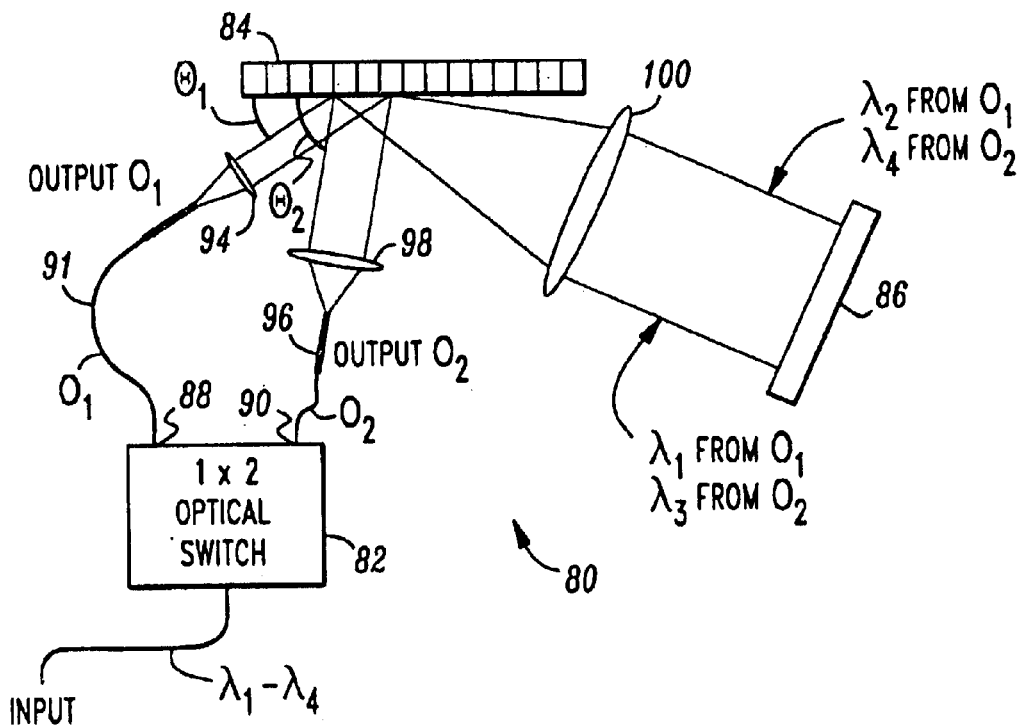
FIG. 8 illustrates a bulk optic spectrometer of the present invention utilizing a 1×2 optical switch and bulk optic lens elements with a single diffraction grating and detector array.

Laser radiation from tunable Hewlett Packard and Photonetics external cavity lasers (ECLs) were multiplexed together and used as inputs to the device. FIG. 8 shows the spectral response of a dual grating monitor designed as described in this Example when there is no voltage applied across the optical switch leads. In this configuration, the light entering the switch is directed to output port 46 and, hence, through grating 32. The corresponding wavelength range incident on detector array 40 is 1556–1591 nm. Similarly, FIG. 9 displays the response when a 5V bias is applied across the leads. Here, light is directed to output port 48 and thereafter through grating 34, resulting in a measured spectrum from 1529–1564 nm.

FIG. 8 illustrates an alternative monitor 80 of the present invention where the ability to present two (or more) separate groupings of wavelengths to be measured using a single detector structure is derived from utilizing bulk optic devices that may be arranged to provide the separate groupings of optical signals. As shown, monitor 80 utilizes a 1×2 optical switch 82 and a single diffraction grating 84, in association with other bulk optic components, to direct either one of a first optical output $O_1$ or a second optical output $O_2$ toward a detector 86, where in the particular arrangement of FIG. 8 detector 86 comprises an array of separate detector elements. In this particular embodiment, as well as those discussed below, the diffraction grating(s) may be replaced by a prism, or any other bulk optic device suitable for separating an incoming beam into separate wavelengths.

Referring back to FIG. 8, optical switch 82 includes a pair of output ports 88 and 90 which are mounted such that the light exiting these ports can then be collimated and directed toward diffraction grating 84. In particular, the first optical output $O_1$ exits first purl 88, travels along an output signal path 92 (such as a section of optical fiber) and thereafter passes through a first collimating lens 94. First collimating lens 94 is positioned with respect to diffraction grating 84 at a first angle $\theta_1$. The position of first angle $\theta_1$ is carefully chosen such that this angle of incidence will result in diffraction grating 84 providing as an output all optical signals within a predetermined range of $\lambda_1$–$\lambda_2$ (this technique being well-known in the art). Similarly, the second optical output $O_2$ from optical switch 82 is coupled through the remaining output port 90, into an optical signal path 96 and collimated by a second collimating lens 98, where the collimated form of optical output $O_1$ is thereafter directed to diffraction grating 84 at a second, predetermined angle $\theta_2$, where the value of angle $\theta_2$ is chosen such that all wavelengths within a predetermined range of $\lambda_3$–$\lambda_4$ will be diffracted when signal $O_2$ impinges diffraction grating 84. In accordance with the present invention, switch 82 is controlled so that only one or the output optical signals $O_1$ or $O_2$ is present at any given time.

Diffraction grating 84 functions to angularly disperse the incident light (whether wavelengths $\lambda_1$–$\lambda_2$ or $\lambda_3$–$\lambda_4$) which is then focused onto detector array 86 through a lensing element 100. Lens 100 converts the angular dispersion into a spatial separation such that each pixel in detector array 86 will be responsive to a different, narrow wavelength range within the diffracted bandwidth. The entire wavelength range that can be measured with detector array 86 has a bandwidth that is fixed by the focal length f of lens 100. Decreasing f increases the bandwidth, but at the cost of reduced resolution, since for a given detector the same number of pixels would span a larger wavelength range. Of course, changing the values of $\theta_1$ and/or $\theta_2$ allows for the particular wavelength range diffracted by the grating to be modified without changing the bandwidth.

As with the other arrangements described above, switch 82 and photodetector array 86 can be controlled to modify either one or both of the resolution and bandwidth range utilized by monitor 80. That is, over a given wavelength range, the resolution achievable with a given detector can be doubled by using $O_1$ for half of the desired resolution and $O_2$ for the remaining portion of the resolution. In this case, the focal length f of the device would be changed to reduce the bandwidth by a factor of 2, doubling the resolution for each half Alternatively, for a fixed resolution, the wavelength range can be doubled by keeping f and the bandwidth fixed and choosing the two wavelength ranges to be adjoining. Any combination of these two extremes can also be utilized to provide a lesser degree of improvement for both resolution and wavelength range.

Figure 9:
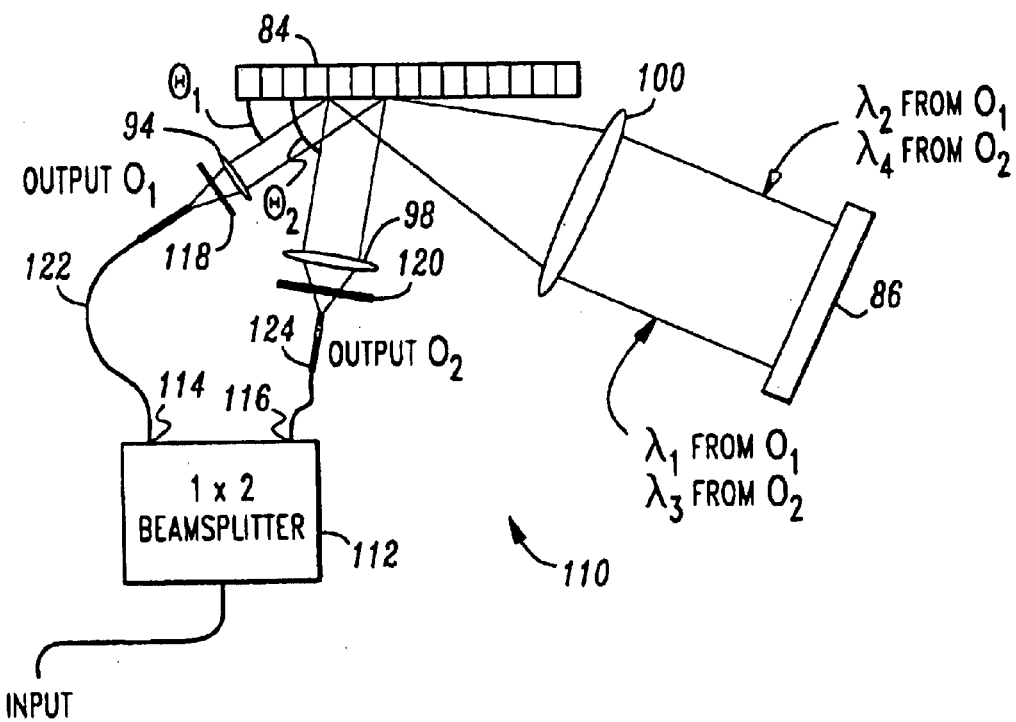
FIG. 9 is an alternative to the arrangement of FIG. 8 wherein a 1×2 optical beam splitter and optical shutters are used in place of a 1×2 optical switch.

FIG. 9 illustrates an exemplary monitor 110 that differs from monitor 80 of FIG. 8 only in the choice of the input optical elements. As shown, a 1×2 optical beam splitter 112 is used in place of optical switch 82, where beam splitter 112 is considered to be a relatively simpler and less expensive component than an optical switch. In this case, the same optical output signal will appear, simultaneously at each output port 114 and 116 of beam splitter 112. The control between the particular output beam chosen to impinge grating 84 is selected in this embodiment by using a pair of optical shutters 118 and 120, each shutter disposed in a separate optical signal path 122 and 134, respectively from beam splitter 112. The outputs are then controlled in time, with only one shutter permitted to be "open" at a given point in time. In particular and as shown in FIG. 9, when first shutter 118 is "open", first optical signal $O_1$ will be allowed to pass through collimating lens 94 and impinge diffraction grating 84 (second optical signal $O_2$ being blocked by the "closed" position of second shutter 120). Alternatively, when second shutter 120 is "open", second optical signal $O_2$ will be allowed to pass through second shutter 120, second collimating lens 98 and impinge diffraction grating 84. Again, the angle of incidence of $O_1$ (i.e., $\theta_1$) or $O_2$ (i.e., $\theta_2$) will control the particular wavelength range diffracted by grating 84. The remaining components illustrated in FIG. 9 are essentially identical to those illustrated in FIG. 8 and discussed above in association with the operation of monitor 80.

Figure 10:
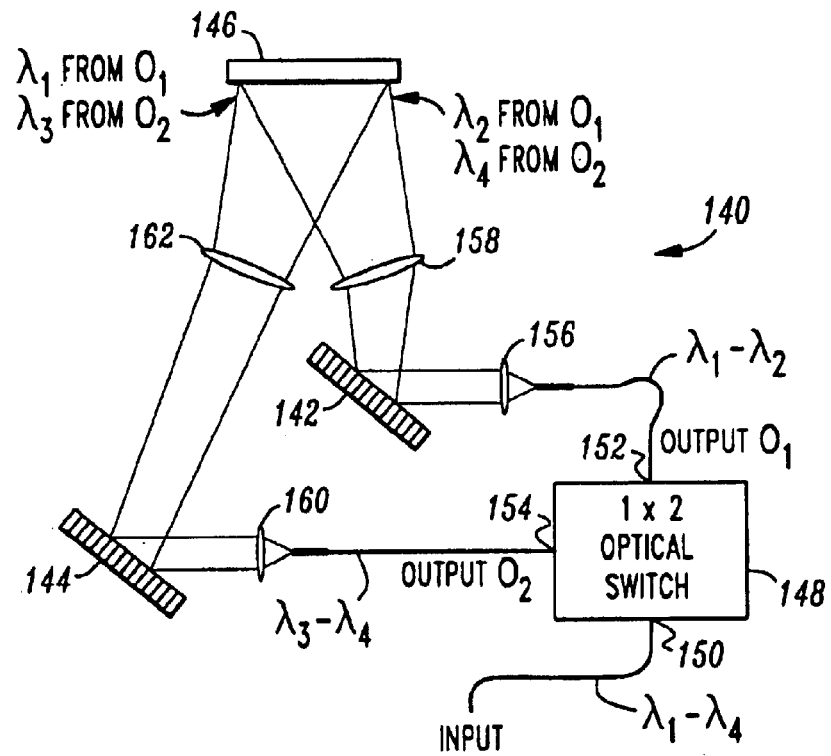
FIG. 10 illustrates an alternative bulk optic arrangement of the present invention utilizing a pair of diffraction gratings with a 1×2 optical switch to provide a pair of optical beams that can alternately be incident on a single detector array.

An alternative bulk optic component monitor arrangement 140 of the present invention is illustrated in FIG. 10. In this case, the pair of blazed gratings within a fiber, as discussed in various above embodiments, is replaced by a pair of bulk diffraction gratings 142 and 144, where grating 142 and 144 are chosen to exhibit particular parameters (e.g., periodicity, blaze angle) such that each grating diffracts a different wavelength range. Referring to FIG. 10, monitor 140 includes a 1×2 optical switch 148 responsive at an input port 150 to a light beam consisting of signals at various wavelengths between $\lambda_1$–$\lambda_4$. Optical switch 148 functions as described above to provide a first output signal $O_1$ at a first output port 152 arid a second output signal $O_2$ at a second output port 154. Output signal $O_1$ then passes through a first collimating Lens 156 and the collimated beam impinges first bulk diffraction grating 142. As with the arrangements described above, first diffraction grating 142 is configured to diffract a predetermined wavelength range, denoted $\lambda_1$–$\lambda_2$ in FIG. 10. A lens 158 then changes the angular separation of this wavelength range into a spatial separation and directs the separate wavelengths onto a detector array 146. In a similar manner, output signal $O_2$ from optical switch 148 will be collimated through a lens 160 and impinge a second bulk optic diffraction grating 144. Second diffraction grating 144 is properly designed so as to diffract a predetermined wavelength range $\lambda_3$–$\lambda_4$, which then passes through lens 162. As with first lens 158 second lens 162 functions to change the angular separation of this wavelength range into a spatial separation, where the spatially separate wavelengths are then directed onto detector array 146. As with all of the other embodiments discussed above, the action of switch 148 is sued to control which output signal, $O_1$ or $O_2$ is active at any given time. Moreover, and as with the arrangements discussed above, the various components within monitor 140 can be configured to provide improved resolution in the detection process, an increased system wavelength range, or a compromise between these two requirements.

Figure 11:
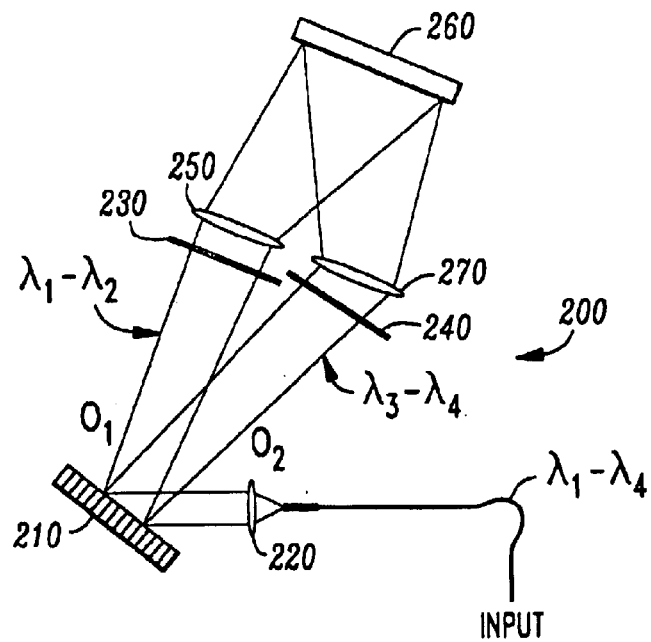
FIG. 11 contains a diagram of yet another bulk optic embodiment of the present invention, this arrangement utilizing a single diffraction grating to provide both first- and second-order diffracted output signals as the separate outputs to the detector array.

An alternative arrangement of the present invention can be configured to sue both the first-order and second-order diffracted beams exiting a single diffraction grating. Monitor 200 as shown in FIG. 11 includes a single diffraction grating 210 which receives as an input a collimated version of an optical signal O (using, for example, a collimating lens 220). A first-order diffracted beam output $O_1$ from grating 210 will include a first set of wavelengths $\lambda_1$–$\lambda_2$ and a second-order diffracted output $O_2$ will include wavelengths $\lambda_3$–$\lambda_4$, where outputs $O_1$ and $O_2$ are spatially separated as shown in FIG. 11. Instead of using an optical switch to control the alternation between output signals, a pair of optical shutters 230, 240 are used and positioned as shown in FIG. 11. In particular, a first shutter 230 is disposed in the optical signal path of first output signal $O_1$, where a first lens 250 is disposed beyond first shutter 230 and used to convert the angular separation between wavelengths $\lambda_1$–$\lambda_2$ into a spatial separation prior to the beam impinging a detector array 260. Second shutter 240 is similarly positioned in the signal path of second output signal $O_2$, where a lens 270 is used to convert the wavelengths $\lambda_3$–$\lambda_4$ into a set of spatially separated signals.

It is to be understood that there are many variations to the embodiments as discussed above that are considered to fall within the spirit and scope of the present invention. For example, the blazed gratings may comprise fiber gratings, channel or planar waveguide gratings or, in general, any suitable type of light guiding gratings. Geometries other than those illustrated in FIGS. 3 and 5 may be utilized and, moreover, used in combination with any suitable type of lensing arrangement capable of focusing the tapped light onto a detecting device, such as, for example, a spherical lens, cylindrical lens or any appropriate combination of such lenses. Indeed, the detecting device itself may take on any suitable arrangement, including a one-dimensional array of photodiodes, a two-dimensional array, each defined as a single "detecting device", or alternatively, a multiple number of separate, smaller detecting devices, perhaps each device for focusing light from a separate grating in a one-to-one relationship. Alternatively, multiple detectors could be used to study the spectra from different gratings. The multiple grating optical waveguide monitor of the present invention may also be utilized as a bidirectional device, accepting optical input signals from either end of the fiber grating structure. All of these variations are considered to fall within the spirit and scope of the present invention as defined by the claims appended hereto.

What is claimed is:

1. An optical monitor for redirecting a portion of an incoming optical signal into a detecting device, the monitor comprising
   a plurality of N input optical waveguides, each capable of receiving as an input said incoming optical signal for propagating along a defined optical axis;
   a plurality of N blazed Bragg gratings, each formed within a separate one of the plurality of N input optical waveguides and defined as comprising a grating period $\Lambda_i$ and blaze angle $\theta_i$ so as to redirect a predetermined range of optical wavelengths out of the optical axis;
   an optical detecting arrangement disposed to receive the redirected optical wavelengths and monitor predetermined characteristics of said input optical signal; and
   a 1×N optical switch including a single input port for receiving the incoming optical signal and a plurality of N output ports, each output port coupled to a separate one of the plurality of N optical waveguides, wherein the switching between output ports is controlled to determine which grating of the plurality of N blazed Bragg gratings will be used with the incoming optical signal.

2. An optical monitor as defined in claim 1 wherein the monitor further comprises an optical lensing arrangement for capturing the predetermined range of optical wavelengths redirected by the plurality of N blazed gratings.

3. An optical monitor as defined in claim 2 wherein the optical licensing arrangement comprises
   an index-matching block disposed to capture the predetermined range of optical wavelengths redirected by the plurality of N blazed Bragg gratings; and
   a lens element disposed at the output of the index-matching block to focus said predetermined range of optical wavelengths onto the optical detecting arrangement.

4. An optical monitor as defined in claim 3 wherein the lens element comprises a spherical lens.

5. An optical monitor as defined in claim 3 wherein the lens element comprises a cylindrical lens.

6. An optical monitor as defined in claim 3 wherein the lens element comprises a compound cylindrical-cylindrical lens.

7. An optical monitor as defined in claim 3 wherein the lens element comprises a concave reflector for redirecting the predetermined wavelengths back through the index-matching element and into the optical detecting arrangement.

8. An optical monitor as defined in claim 2 wherein the plurality of N blazed Bragg gratings comprise a plurality of separate chirped blazed gratings for focusing a plurality of different wavelengths and wherein the optical lensing arrangement comprises a plurality of separate lensing elements for use with the plurality of separate chirped blazed gratings.

9. An optical monitor as defined in claim 1 wherein the plurality of N input, optical waveguides comprise a plurality of N optical fibers including an inner core region and outer cladding layer and the plurality of N blazed Bragg gratings are formed in the core region of their associated optical fibers.

10. An optical monitor as defined in claim 9 wherein the plurality of N optical fibers comprise a plurality of N single mode optical fibers.

11. An optical monitor as defined in claim 9 wherein the plurality of N blazed Bragg gratings comprise photolithographically written gratings.

12. An optical monitor as defined in claim 1 wherein each blazed Bragg grating comprises an essentially identical blaze angle $\theta$.

13. An optical monitor as defined in claim 1 wherein at least two blazed Bragg gratings of the plurality of N blazed Bragg gratings comprise different blaze angles $\theta$.

14. An optical monitor as defined in claim 1 wherein at least two Bragg gratings of the plurality of N blazed Bragg gratings comprise a different grating period $\Lambda$.

15. An optical monitor as defined in claim 1 wherein at least one blazed Bragg grating is a chirped grating.

16. An optical monitor as defined in claim 1 wherein each grating in the plurality of N blazed Bragg gratings is a chirped grating.

17. An optical monitor as defined in claim 1 wherein the optical detecting arrangement comprises an array of photodiode devices.

18. An optical monitor as defined in claim 17 wherein the array of photodiode devices is a linear array.

19. An optical monitor as defined in claim 17 wherein the array of photodiode devices is a two dimensional array.

20. An optical monitor as defined in claim 17 wherein the photodetecting arrangement comprises a single photodetecting device capable of being moved to the location required to capture the tapped wavelengths.

21. An optical monitor as defined in claim 1 wherein the monitor further comprises a plurality of N on/off switches, each on/off switch coupled to a separate one of the plurality of N optical waveguides and controlled to determine which grating of the plurality of N blazed Bragg gratings will be used with the incoming optical signal.

22. An optical monitor as defined in claim 1 wherein the plurality of N optical waveguides comprises a pair of optical waveguides and the plurality of N blazed Bragg gratings comprises a pair of blazed Bragg gratings.

23. An optical monitor for redirecting a portion of a plurality of M incoming optical signals into a detecting device, the monitor comprising
   a plurality of N input optical waveguides, each capable of receiving as an input one or more of said plurality of M incoming optical signals for propagating along a defined optical axis;
   an optical coupling arrangement for providing the plurality of M optical input signals as inputs to one or more of the plurality of N input optical waveguides;
   a plurality of N blazed Bragg gratings, each formed within a separate one of the plurality of N input optical waveguides and defined as comprising a grating period $\Lambda_i$ and blaze angle $\theta$ so as to redirect a predetermined range of optical wavelengths out of the optical axis; and an optical detecting arrangement disposed to receive the redirected optical wavelengths and monitor predetermined characteristics of said input optical signal, wherein the optical coupling arrangement comprises a plurality of N on/off switches, each on/off switch coupled to a separate one of the plurality of N optical waveguides and controlled to determine which grating of the plurality of N blazed gratings will be used with one input signal of the plurality of M input optical signals.

24. An optical monitor as defined in claim 23 wherein the monitor further comprises an optical lensing arrangement for capturing the predetermine range of optical wavelengths redirected by the plurality of N blazed gratings.

25. An optical monitor as defined in claim 24 wherein the optical lensing arrangement comprises an index-matching block disposed to capture the predetermined range of optical wavelengths redirected by the plurality of N blazed Bragg gratings; and a lens element disposed at the output of the index-matching block to focus said predetermined range of optical wavelengths onto the optical detecting arrangement.

26. An optical monitor as defined in claim 25 wherein the lens element comprises a spherical lens.

27. An optical monitor as defined in claim 25 wherein the lens element comprises a cylindrical lens.

28. An optical monitor as defined in claim 25 wherein the lens element comprises a compound cylindrical-cylindrical lens.

29. An optical monitor as defined in claim 25 wherein the lens element comprises a concave reflector for redirecting the predetermined wavelengths back through the index-matching element and into the optical detecting arrangement.

30. An optical monitor as defined in claim 24 wherein the lensing arrangement comprises a plurality of separate lensing elements, for use with a plurality of separate blazed gratings.

31. An optical monitor as defined in claim 24 wherein the optical detecting arrangement comprises an array of photodiode devices.

32. An optical monitor as defined in claim 31 wherein the array of photodiode devices is a linear array.

33. An optical monitor as defined in claim 31 wherein the array of photodiode devices is a two dimensional array.

34. An optical monitor as defined in claim 31 wherein the photodetecting arrangement comprises a single photodetecting device capable of being moved to the location required to capture the tapped wavelengths.

35. An optical monitor as defined in claim 24 wherein the monitor functions in a bidirectional configuration so as to allow for input optical signals to propagate in either direction through the plurality of N blazed Bragg gratings.

36. An optical monitor as defined in claim 23 wherein the plurality of N input optical waveguides comprise a plurality of N optical fibers including an inner core region and outer cladding layer and the plurality of N blazed Bragg gratings are formed in the core region of their associated optical fibers.

37. An optical monitor as defined in claim 36 wherein the plurality of N optical fibers comprise a plurality of N single mode optical fibers.

38. An optical monitor as defined in claim 36 wherein the plurality of N blazed Bragg gratings comprise photolithographically written gratings.

39. An optical monitor as defined in claim 23 wherein each blazed Bragg grating comprises an essentially identical blaze angle $\theta$.

40. An optical monitor as defined in claim 23 wherein at least two blazed Bragg gratings of the plurality of N blazed Bragg gratings comprise different blaze angles $\theta$.

41. An optical monitor as defined in claim 23 wherein at least two Bragg gratings of the plurality of N blazed Bragg gratings comprise a different grating period $\Lambda$.

42. An optical monitor as defined in claim 23 wherein at least one blazed Bragg grating is a chirped grating.

43. An optical monitor as defined in claim 23 wherein each grating in the plurality of N blazed Bragg gratings is a chirped grating.

44. An optical monitor as defined in claim 23 wherein the optical coupling arrangement comprises an M×N coupler for providing the plurality of M incoming optical signals as inputs to the plurality of N input optical waveguides.

45. An optical monitor as defined in claim 23 wherein the optical coupling arrangement comprises a 1×N optical switch including a single input port for receiving one of the plurality of M input optical signals and a plurality of N output ports, each out put port coupled to a separate one of the plurality of N optical waveguides.

46. An optical monitor as defined in claim 23 wherein the optical coupling arrangement comprises a plurality of N pass through ports, each coupled to a separate one of the plurality of N optical waveguides for providing as an input a selected one of the plurality of M input optical signals.

47. An optical monitor as defined in claim 23 wherein the optical coupling arrangement comprises a plurality of elements chosen from the group consisting of: on/off switches, optical matrix switches, optical couplers, and pass through ports for directing one or more of the plurality of M input optical signals into one or more of plurality of N optical waveguides.

* * * * *